J. L. PERKINS.
PRESSURE REGULATING MEANS.
APPLICATION FILED MAR. 1, 1912.
1,079,904.
Patented Nov. 25, 1913.
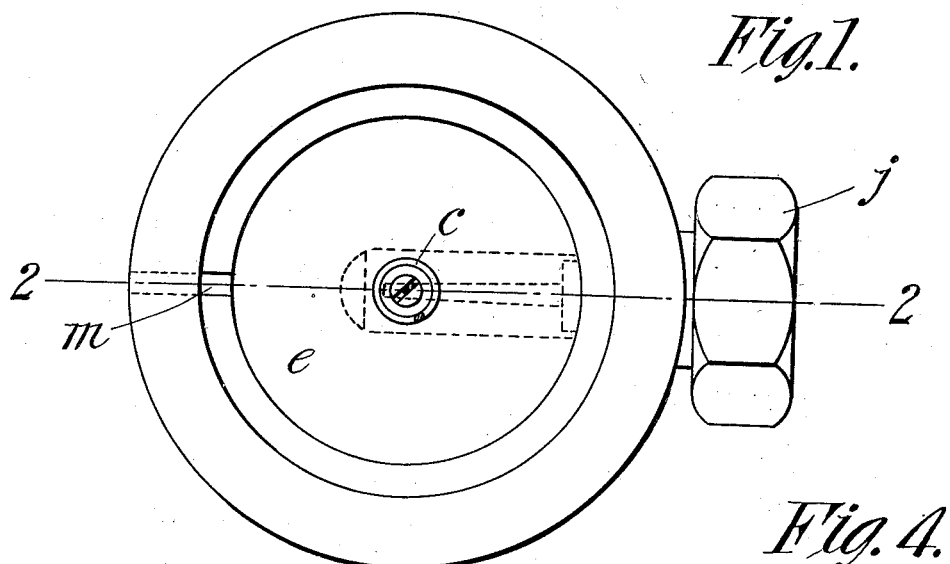
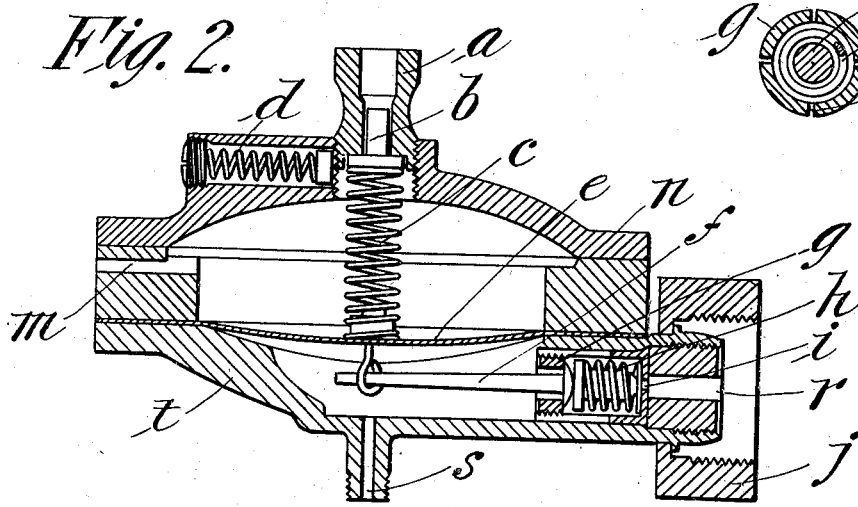
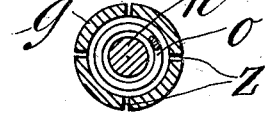
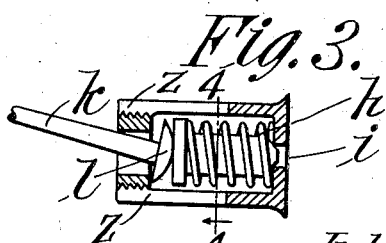
WITNESSES:
INVENTOR,
Julian L. Perkins,
BY
Chapin & Leo
ATTORNEY.

UNITED STATES PATENT OFFICE.

JULIAN LEIGH PERKINS, OF SPRINGFIELD, MASSACHUSETTS, ASSIGNOR, BY MESNE ASSIGNMENTS, TO FRED. E. MUZZY, OF SPRINGFIELD, MASSACHUSETTS.

PRESSURE-REGULATING MEANS.

1,079,904.  Specification of Letters Patent.  Patented Nov. 25, 1913.

Application filed March 1, 1912. Serial No. 680,978.

*To all whom it may concern:*

Be it known that I, JULIAN L. PERKINS, a citizen of the United States of America, residing at Springfield, in the county of Hampden and State of Massachusetts, have invented new and useful Improvements in Pressure-Regulating Means, of which the following is a specification.

This invention relates to a pressure regulating means.

Pressure regulators for controlling the flow of fluids through conduits and operating to open and close a valve as the pressure of the gas or other fluid decreases or increases are old. Such regulators usually include a diaphragm more or less sensitive to the pressure of the gas passing through the conduit. This invention is built upon the class of regulators referred to.

The object of the invention is to provide a diaphragm-operated valve which will work under all possible conditions of service.

Other objects of the invention will appear in the detailed description and annexed claims.

In the drawings forming part of this application,—Figure 1 is a plan view of the regulator. Fig. 2 is a section taken on the line 2—2, Fig. 1. Fig. 3 is a detail view of the valve as operated. Fig. 4 is a section taken on line 4—4, Fig. 3.

Referring to the drawings, Fig. 2, the diaphragm $e$ is held at its outer edge by the upper and lower castings $m$ and $t$ of the regulator. The middle part of the diaphragm has an eye-bolt passed therethrough around which the expansible spring $c$ coils and presses said diaphragm in a dish-shaped form by virtue of its engagement with the lower surface of part $b$. The adjusting nut $a$ is utilized for increasing or decreasing the pressure of the spring $c$ on the diaphragm and thus controlling the setting of the regulator for different operable pressures in an obvious manner. The spring $d$, and its adjusting screw, cause a lateral pressure on the nut $a$ to prevent the accidental movement of said nut which would change the setting of the regulator. The passage $m$ insures atmospheric pressure above the diaphragm.

The regulator is fastened to a gas tank by the nut $j$, or other source of fluid material. The gas passes through the passage $r$ through inlets $i$ and $g$ to the space below the diaphragm and out to the point of use by passages $s$.

A rod $f$ rests with one end in the opening of the eye-bolt, and the other end (which has a circular and rounded head) is normally pressed against the rear wall of the interior opening of the part $g$ by the enlarged flat head of the valve-piece $h$ pushed backward by the spring $o$ bearing against the front wall of the same interior opening, all as shown.

The operation of the regulator is as follows:—When the gas passing through the regulator is at the desired pressure, the parts are in position shown in Fig. 2. If the gas should increase in pressure, the diaphragm $e$ will be forced up against the spring $c$ and the eye-bolt will raise the end of the rod $f$ which will cause the edge of the head of the rod $f$ to fulcrum against the surface of the part $g$ and the rounded surface of said head to force the flat head of the valve $h$ against the spring $o$ to close the opening $i$ and thus control the gas inlet in a way to control the pressure under the diaphragm. When the valve is completely closed, the parts assume the position shown in Fig. 3. The rod $f$ passes through a circular hole in entering the part $g$, and at no point is said rod pivoted or bound rigidly to any other part.

Referring to Fig. 2, the rod $f$ can be raised not only in a vertical plane but on an incline to the horizontal. The end of this rod can be freely moved in any angle in any plane, and no matter at what angle it is moved in by the diaphragm from the position shown in Fig. 2, the rounded head thereof will force the valve $h$ inwardly.

With the structure described, the valve must operate at the least movement of the diaphragm. There is no chance of binding, as in the case where pivots are used for the valve-operating rod. The regulator is therefore more dependable in severe service where it can not be protected from knocks and jars which would affect the operation of the usual pressure regulator.

Applicant's invention can be embodied in various specific forms, only one form being shown herein to disclose the broad invention, and the preferred specific form of the invention.

What I claim, is:—

1. A pressure-regulator, comprising a casing having a gas-inlet and a gas-outlet passage, a pressure diaphragm therein, a valve controlling one of said passages, means for normally holding said valve in one of its extreme positions, together with a rod loosely connected with the diaphragm for movement therewith and having a head adapted to pivot against a fixed part of the casing and engage the valve to move it toward the other of its extreme positions, all for the purpose described.

2. A pressure regulator comprising a casing, inlet and outlet passages thereto, a diaphragm therein, a valve controlling one of said passages spring-pressed into one of its extreme positions, a rod loosely hung at one end from said diaphragm with a cam head at the other end and a surface against which said cam head can fulcrum whenever the diaphragm moves the end of the rod in any direction to move the valve from one position to another.

3. A pressure regulator comprising a casing divided by a diaphragm into two parts, one part open to the atmosphere, and the other part having inlet and outlet passages, a spring pressing on said diaphragm, a nut having a thread engagement with said casing against which the spring also presses thereby to control the sensitiveness of the diaphragm, a spring normally pressing on said nut to fix its adjustment, a valve for one of said passages normally spring-pressed to open position, a rod hung loosely from said diaphragm for movement therewith, a cam-head on said rod, a surface on which said head can fulcrum on movement of the rod whereby said cam-head can move the valve toward closed position when the pressure on one side of the diaphragm increases.

JULIAN LEIGH PERKINS.

Witnesses:
 FRANKLIN G. NEAL,
 K. I. CLEMONS.